(12) United States Patent
Yoshimura

(10) Patent No.: US 6,991,297 B2
(45) Date of Patent: Jan. 31, 2006

(54) BUILT-UP AUTOMOBILE/MOTORBIKE WHEEL OF LIGHT ALLOY

(75) Inventor: Katsunori Yoshimura, Fukui (JP)

(73) Assignee: Washi Kosan Co., Ltd., Tokyo (JP)

( * ) Notice: Subject to any disclaimer, the term of this patent is extended or adjusted under 35 U.S.C. 154(b) by 0 days.

(21) Appl. No.: 10/451,933

(22) PCT Filed: Dec. 20, 2001

(86) PCT No.: PCT/JP01/11218

§ 371 (c)(1),
(2), (4) Date: Aug. 20, 2003

(87) PCT Pub. No.: WO02/051650

PCT Pub. Date: Jul. 4, 2002

(65) Prior Publication Data

US 2004/0066086 A1    Apr. 8, 2004

(30) Foreign Application Priority Data

Dec. 25, 2000   (JP)   ................. 2000-393014

(51) Int. Cl.
B60B 23/10   (2006.01)

(52) U.S. Cl. ................. 301/11.1; 301/63.108; 301/65

(58) Field of Classification Search ......... 301/9.1, 301/10.1, 11.1, 64.101, 64.201, 64.202, 65
See application file for complete search history.

(56) References Cited

U.S. PATENT DOCUMENTS

| | | | | |
|---|---|---|---|---|
| 1,566,344 A | * | 12/1925 | Perrot et al. | 301/65 |
| 1,652,653 A | * | 12/1927 | Whitcomb | 301/63.108 |
| 2,051,501 A | * | 8/1936 | Sorensen et al. | 29/894.351 |
| 2,110,126 A | * | 3/1938 | Gannett | 301/64.304 |
| 2,439,881 A | * | 4/1948 | Ash | 301/65 |
| 4,449,756 A | * | 5/1984 | Weeks | 301/37.42 |
| 4,982,998 A | | 1/1991 | Mikawa | |
| 4,997,235 A | * | 3/1991 | Braungart | 301/11.1 |
| 2004/0032161 A1 | * | 2/2004 | Smyth | 301/9.1 |

FOREIGN PATENT DOCUMENTS

| | | |
|---|---|---|
| JP | 57-66001 | 4/1982 |
| JP | 62-36901 | 3/1987 |
| JP | 5-74901 | 10/1993 |
| JP | 9-240201 | 9/1997 |
| WO | 97/31792 | 9/1997 |

* cited by examiner

Primary Examiner—Russell D. Stormer
(74) Attorney, Agent, or Firm—Jordan and Hamburg LLP

(57) ABSTRACT

A two-piece-wise built-up light-alloy wheel with a rather big diameter for automobiles and two-wheeled vehicles, being aimed to be made as lightweight and have an improved ornamental appearance, comprising: a rim (2) having outer and inner rim portions integrally formed with each other; a center disk (1) built-up with the integral rim (2); fastener bolts fastening the rim with the center disk; and a plurality of thick-wall portions (9) bulging from and integrally formed with the outer rim portion as bulging toward center of the wheel, as to form screw holes for the fastener bolts. Thickness of the rim (2) is substantially same except for the thick-wall portions, throughout from a bead seat (6) on the outer rim portion through a well part (8).

6 Claims, 7 Drawing Sheets (a)

(b)

BUILT-UP AUTOMOBILE/MOTORBIKE WHEEL OF LIGHT ALLOY

TECHNICAL FIELD

The present invention relates to a built-up type light-alloyed wheel for automobiles and two-wheeled vehicles, which comprises two pieces of an integral rim and a center disk joined together by fasteners, such as bolts.

BACKGROUND ART

FIG. 12 and FIGS. 13(a)–13(b) show a conventional wheel of the two-piece type. FIG. 12 is a front view of a wheel; wherein the left half represents a state that a center disk 101 is attached on an integral rim 102 by fastener bolts 103 while the right half a state the center disk 101 is detached from the integral rim 102. FIGS. 13(a)–13(b) are vertical sectional views taken parallel with a rotary axis, wherein the integral rim 102 integrally comprises an outer rim flange 104, a bead seat 106 on an outer rim side, a well part 108, a bead seat 107 on an inner rim side, and an inner rim flange 105. Meanwhile, the center disk 101 is fixed to the integral rim 102 by tightening a plurality of fastener bolts 103 inserted in tapped holes 110 provided in thick-wall portions 109 of the integral rim 102; this thick-wall portions 109 being disposed throughout along a whole circumference of the rim. FIG. 13(b) shows a magnifying sectional view of the thick-wall portion in part encircled by the one-dot-chain line. The fastener bolt 103 usually has a diameter of 6–8 mm in its thread portion, though depending upon the number of bolts used. The thick-wall portion 109 of the integral rim 102, having a tapped hole in size meeting the thread diameter, has a diametrical thickness T of nearly 14 mm for the forged rim of aluminum alloy and requires nearly 16 mm for the cast rim of that material. This however poses a cause of increasing the weight of wheel to a conspicuous extent. Because this thick-wall portion 109 is provided throughout whole circumference of the rim, providing of the thick-wall portion 109 increases a weight of the rim of 18" diameter (18" in bead-seat diameter) by about 700 g, for example, even when the rim is a light-alloy forged one. Increase of the weight corresponds to a bulge or an extra thickness exceeding an originally required rim thickness. Even where the integral rim and the disk are formed of aluminum alloy, a two-piece wheel having a diameter 18" and width 8", similar with the embodiment of the invention, may have a weight of 10 kg odd, though the weight may be varied with design of the center disk. Such a built-up type is superior in design aspect to the one-piece wheel made with an integral center disk and rim, but has drawback to weight increase. Such weight increase in a built-up type wheel is problematic where considering the fact that the wheels of 19" and 20" diameters recently have brought into a practical stage of use. Meanwhile, the thickness of the well part 108 is about 3.2 mm for manufacture with aluminum-alloy forging and is about 5.0 mm for manufacture with aluminum-alloy casting; and thus, as shown in FIG. 13(b), the thickness of the well part 108 is greatly different with that of the thick-wall portion 109. Consequently, stress concentration unavoidably occurs in the boundary portion 111 even if formed with moderate curvature radiuses R, R' as shown in the figure. Thus, when the wheels are subjected to radial-load endurance tests until fracture of the wheels, there have been many cases of crack occurrence in the boundary portion 111 as a neck portion.

The present invention has been made in view of the above; and is to achieve reducing of the weight in the built-up light-alloy wheels in diameter of 17", 18", 19" or 20" for four-wheeled vehicles, which are rather big in diameter for the four-wheeled vehicles; and those in greater diameter for two-wheeled vehicles. The present invention is also to achieve improvement in design of the wheel.

DISCLOSURE OF THE INVENTION

A two-piece-wise built-up light-alloy wheel for automobiles and two-wheeled vehicles comprising: a rim having outer and inner rim portions integrally formed with each other; a center disk built-up with the integral rim; fastener bolts fastening the rim with the center disk; and a plurality of thick-wall portions bulging from and integrally formed with the rim, as to form screw holes for the fastener bolts; thickness of the rim being substantially same except for the thick-wall portions, throughout from a bead seat part on the outer rim portion through a well part. By this manner, weight of the rim as a whole is alleviated.

In a two-piece-wise built-up wheel, a single-piece rim is coupled with a disk by use of bolts. In a category of the built-up wheel that has screw holes on the rim as attaching means, portions around the screw holes are needed to be thick-walled in radial direction. When thick-wall portions are formed throughout along a whole circumference of the wheel, additional formation of the thick-wall portions leads to increase of weight of the rim as a whole, although some increase in strength is made for the rim. Further, the additional formation of the thick-wall portions might lead to a stress concentration at a boundary portion between the thick-wall portion and well part, and possibly cause some crack there.

For averting such drawbacks, according to the invention, the formation of the thick-wall portions is made in a manner to minimize overall thickness of the rim, so as to make as lightweight. Further, at boundaries between the thick-wall portions and the rim proper, fillets are formed to avert the stress concentration; and the screw holes are formed as blind holes or non-through holes so that dirt and water do not retained in the screw holes when inserting of the screw as to avoid corrosion of the screws.

Meanwhile, according to claim 3 of the invention, a resinous piece is fixed on a depressed area between the thick-wall portions and the center disk. This is aimed to avert dirt being attached and to avert water being retained, onto the depressed area. Since a major aim of the invention is to make a wheel as lightweight, the resinous pieces are preferably formed of a foamed resin. In view of heatproof durability, aromatic polyamide resin and polyimide resin are preferable. As for making a surface of the foamed resin exposed inward of the rim to be flat and smooth and ensuring removal of dirt and water, the surface is coated with an ultra water-repellent paint or varnish of silicone resin base or fluorocarbon resin base, after the foamed resin pieces are attached on the depressed area.

BRIEF DESCRIPTION OF DRAWINGS

FIG. 8(a) is a fragmentary magnifying sectional view of a work in the forging process while FIG. 8(b) is an F—F sectional view of the thick-wall portion;

FIG. 9(a) shows an essential part and FIGS. 9(b) and 9(c) are perspective views of the rim and resinous piece respectively;

FIG. 13(a) is a half-part sectional view of the conventional two-piece type built-up wheel while FIG. 13(b) is a magnifying sectional view of a thick-wall portion thereof.

Figure 1:
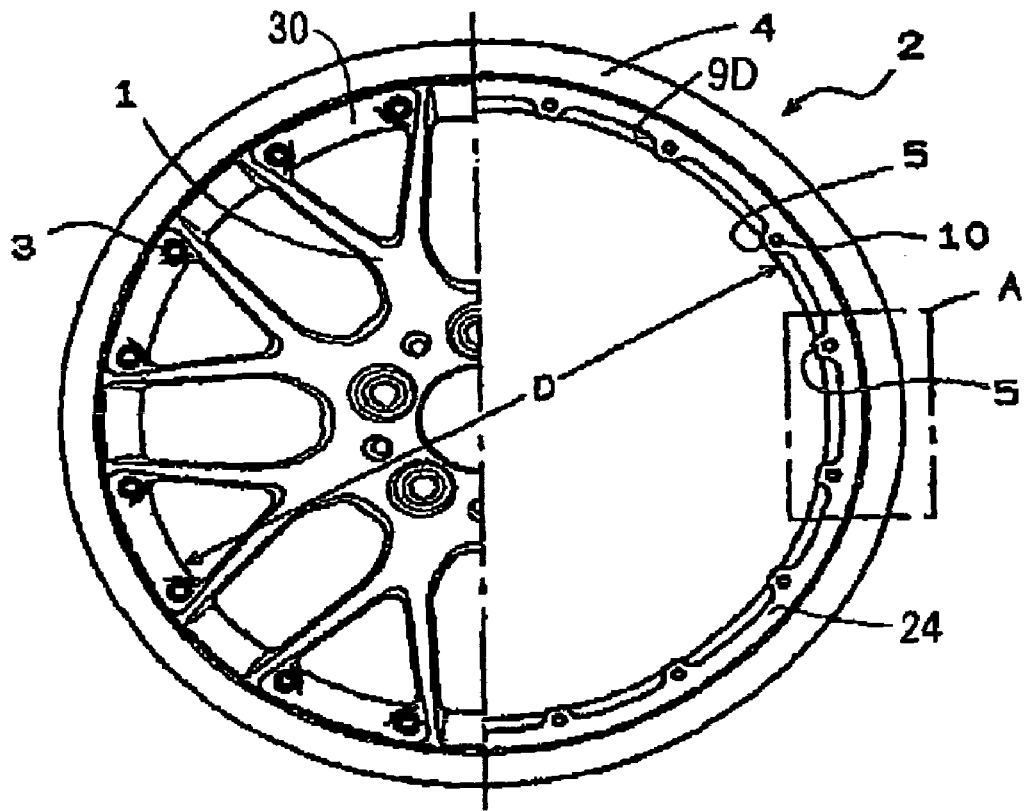
FIG. 1 is a front view of a built-up type lightweight wheel showing one embodiment of the present invention.

NUMERAL REFERENCES 1 center disk
2 rim
3 fastener bolt
4 outer rim flange
5 fastener-bolt-attaching portions
6 bead seat at outer rim portion
8 well part
9 thick-wall portion
10 tapped hole (female-screw threaded hole)
11 boundary portion
12 portion omitted with the thick-wall formation
14 stepped portion
15 work
16 upper mold
17 upper-mold knockout
18 lower mold
19 lower-mold knockout
20 recess
21 peripheral portion
22 protrusion
23 concave-curved surface
25 depressed are
26 resinous piece
27 dirt-proof layer
28 coupling piece

BEST MODE FOR CARRYING OUT THE INVENTION

Explanations will be made on preferred embodiments of built-up type light-alloyed wheels for automobiles and two-wheeled vehicles of the present invention.

Figure 2:
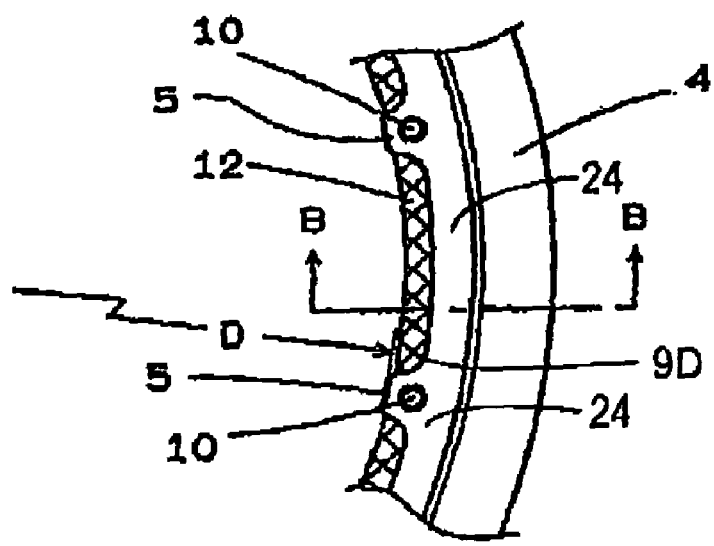
FIG. 2 is a magnifying view of a part A shown in FIG. 1.
Figure 3:
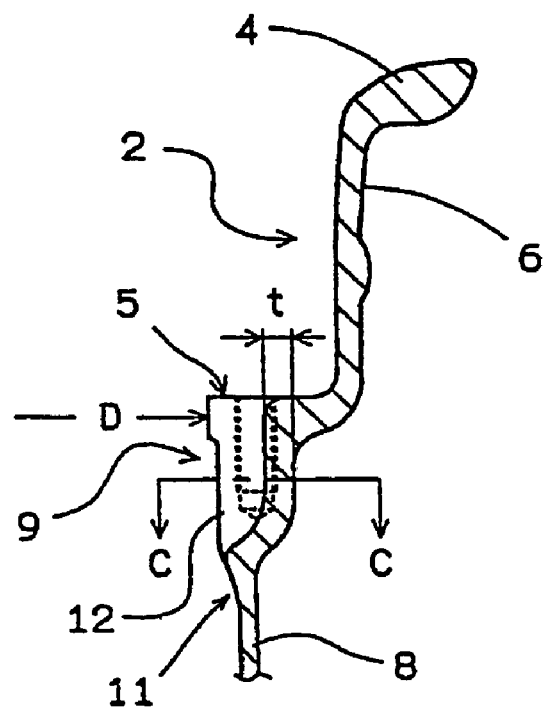
FIG. 3 is B—B sectional view of a rim shown in FIG. 2.
Figure 4:
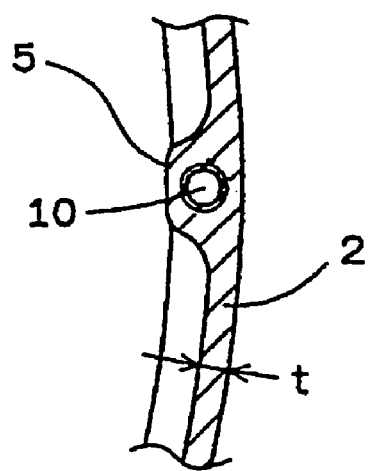
FIG. 4 is a C—C sectional view of a thick-wall portion shown in FIG. 3.

In a left half of FIG. 1 is a front view as viewed from a side of attaching a center disc 1 to an integral rim 2 according to the invention. In a right half of the FIG. 1 is a front view of the rim 2. The reference numeral 4 designates an outer rim flange while the numeral 5 denotes a fastener-bolt-attaching portion. This attaching portion is provided with a tapped hole 10 for mounting a center disc, and has a thick-wall periphery in an arcuate form having strength to exhibit a firm holding force in tightening a center disc by using bolts as fasteners. Consequently, the fastener-bolt-attaching portion is a thick-wall portion increased in rim thickness. The center disc 1 is fitted in a center hole (with diameter D) of the rim 2 and fixed on the rim by using fastener bolts 3. FIG. 2 is a magnified view of a part A encompassed by the one-dot-chain line in FIG. 1. In FIG. 3 is shown, as a B—B sectional view in FIG. 2, a state removed of extra or useless thick-wall formation in between the fastener-bolt-attaching portions 5, as indicated by lattice pattern. Whereas conventionally the foregoing thick-wall portion has been provided throughout the entire circumference, in the present embodiment the thick wall is remained as formed in only the fastener-bolt-attaching portions 5 as shown in FIG. 3. The thick wall portions 9 are made such that useless thick-wall formation is omitted between the fastener-bolt-attaching portions 5 in a manner as thickness of the rim 2 substantially same throughout from the outer rim flange 4 to a well part 8 through a bead seat 6. Accordingly, no neck portion is given rise due to stress concentration in boundary portions 11 between the well 8 and the thick-wall portions; thus increasing durability. Reference numerals 12 designate portions omitted with the thick-wall formation. FIG. 4 is a C—C sectional view in FIG. 3; the wall thickness t there, by omitting the useless thick-wall formation, become as reduced down to approximately 4 mm in the aluminum-alloy forged rims and approximately 5.5 mm in the aluminum-alloy cast rims.

[Embodiment 1]

Figure 5:
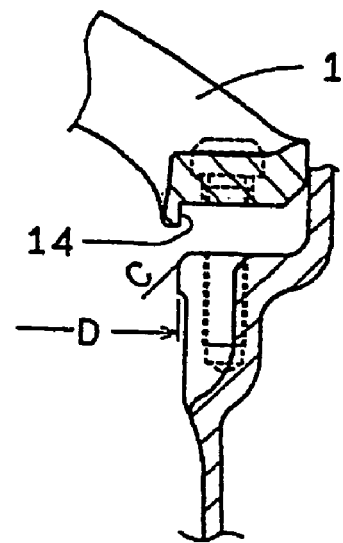
FIG. 5 is a sectional view showing a manner that the disk is fitted in the rim.

The methods for omitting extra or useless thick-wall formation from formation of the thick-wall portion 9 shown in FIG. 3 include two ways. The first method is to finish an integral rim by an NC lathe as in the conventional and then remove extra or useless part of the wall by an end mill such as of a machining center. The second method is to form in advance a shape omitted with extra or useless part of the wall by casting or forging. The inventor trial-manufactured a rim 18" by the first method. The extra or useless parts of the wall are removed, and deviation from the circular form is measured for such removed portions. It is found that opening with diameter D for fitting the center disc was partially elliptic by 0.2–0.3 mm due to balance disturbance of internal stress. In order to solve this problem, dimension of chamfering C, on the rim, at an entrance of the opening with diameter D was set as 1.5 times of conventional one (as changed from 1C to 1.5C), as shown in FIG. 5. Due to this, even if elliptic by 0.3 mm, the stepped portion 14 of the center disk 1 is inserted in the opening of the rim by gradually tightening fastener bolts. By completely tightening the fastener bolts, the deformation on the rim is rectified into a circular form or a perfect circle, by the center disk. After assembling, there were no troubles such as poor balance. However, such method of removing with an end mill results in considerable increase of time in machining the rim and hence lowering in production efficiency.

[Embodiment 2]

Figure 6:
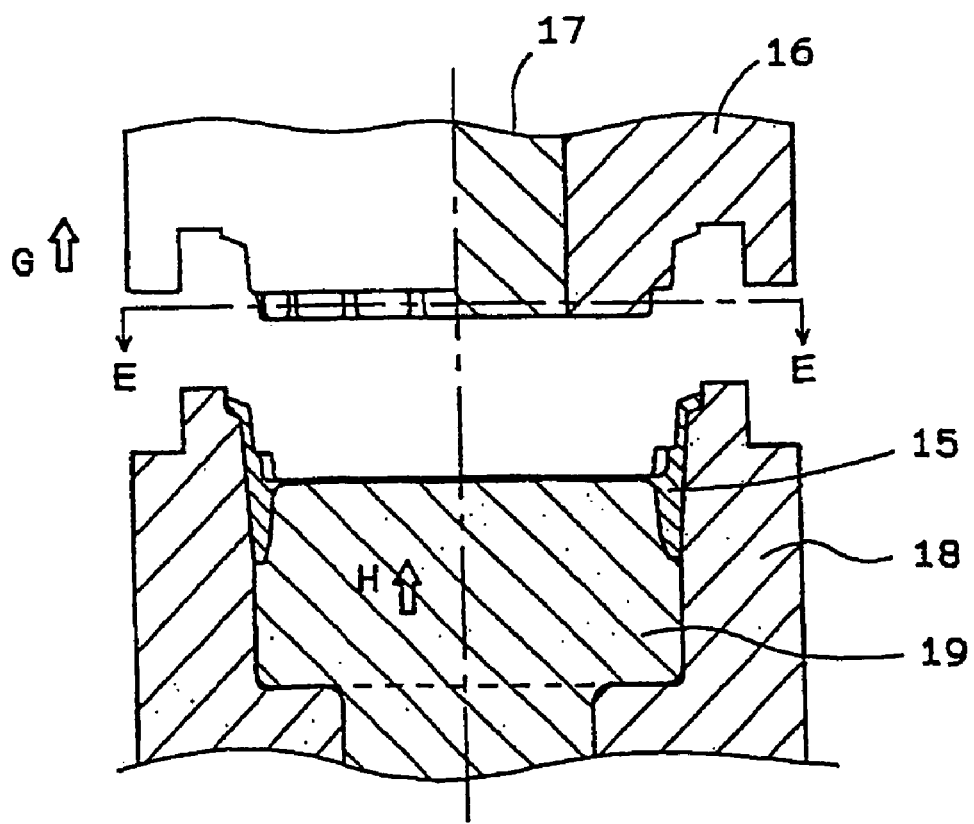
FIG. 6 is a fragmentary sectional view showing a forging process of the invention.

In view of the above, the omission of the extra or useless thick-wall formation is made at a material-preparing process, in accordance of the aforementioned second method. FIG. 6 shows a final forge process on a work 15 as a material for forming the integral rim, wherein shown in an upper mold 16 and upper-mold knockout 17 completing forming is in ascending in a direction of arrow G. The work 15 is left on the lower mold 18 and lower-mold knockout 19, and thereafter the lower-mold knockout 19 ascends in a direction of arrow H and the work 15 is taken out of the mold 18.

Figure 7:
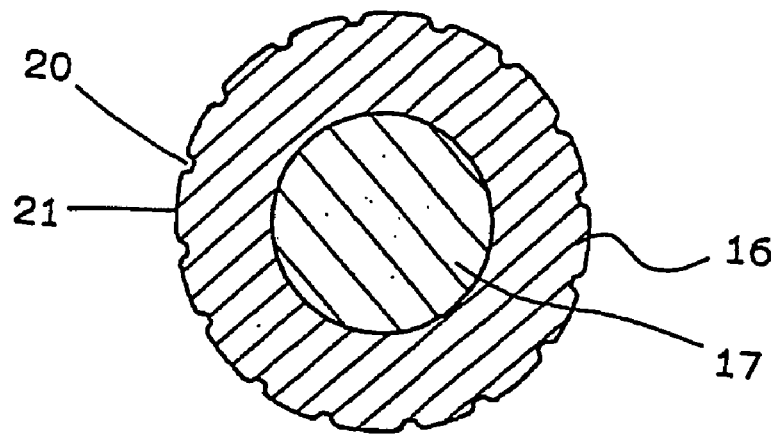
FIG. 7 is an E—E sectional view of an upper mold shown in FIG. 6.
Figure 8:
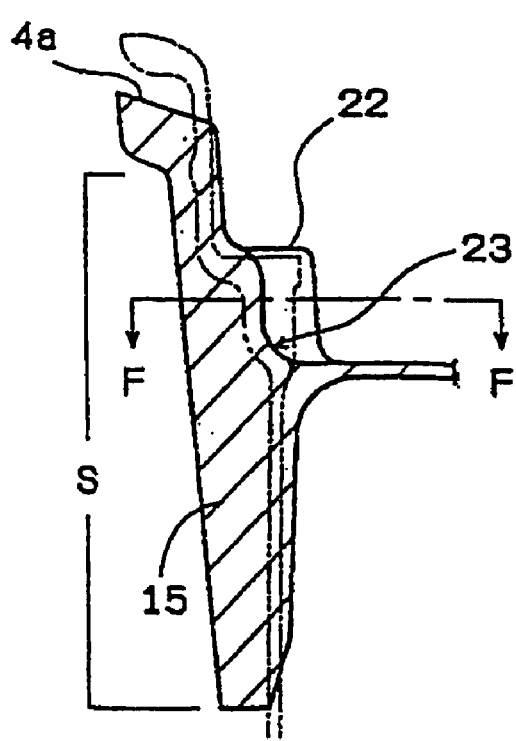
Figure 8:
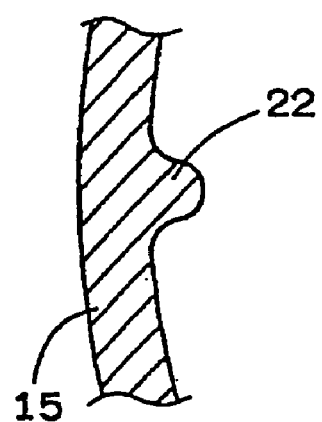

FIG. 7 shows an E—E sectional view of the upper mold shown in FIG. 6. As apparent in this figure, the recesses 20 in the upper mold 16 form protrusions 22 as protruded from and integral with the rim, as to form fastener-bolt-attaching portions. Peripheral portions 21 of the upper mold 16 are to form the portions omitted with the thick-wall formation 12 and reduces the thickness of the rim in regions between the fastener-bolt-attaching portions. A concave-curved surface 23 is formed on inside of the rim in a form that thick-wall fastener-bolt-attaching portions and thin-wall portions are connected together. FIG. 8(a) is a fragmentary magnifying sectional view of the work 15 while FIG. 8(b) is an F—F sectional view. The area shown by the two-dot-chain line depicts a shape after completion of forming by spinning and NC-lathe machining. The work is subjected to spinning process by a conventional technique so that outer part S of the work is pressed by applying a roll as to be extended until reaching a predetermined thickness. Thus, the inner rim portion together with the well part and the outer rim portion are formed as included.

The problem encountered in the present process is whether a circular form or a perfect circle is maintained in the contour after a process of omitting the extra or useless thick-wall formation is made in a stage of preparing a material. The countermeasure to this is as follows: before entering a spinning process, solution treatment and hardening is made for the work 15; hereafter, spinning is made throughout from an inner side of a portion 4a for forming the outer rim portion to the protrusions 22 and the concave-curved surface 23, by use of a not-illustrated mandrel correctly aligned with the work; thereby rectifying the deformation by the hardening and preventing the deformation in the concave-curved surface 23 by the spinning; and, subsequently, a heat treatment by an artificial aging is made for hardening. In working by NC lathe on the work 15, a chuck is used which is capable to be tightly inserted in the concave-curved surface 23 that is formed by omitting the extra thick-wall portions, as to realize centering of the work 15. In this manner, naturally, the integral rim with even wall thickness is obtained.

The rim of the invention is applicable also to wheels for two-wheeled vehicles. Although not shown, the outer rim portion appears in symmetry with the inner rim. An integral rim is formed by forging or casting in a manner of forming protrusions thick-walled only at around tapped-hole portions for bolts fixing the disk. Then, heat-treating and subsequent spinning are made in the foregoing manner as to maintain a circular form or a perfect circle. Thus, the extra thick-wall portions are omitted as to achieve lightweight and durable wheels.

Figure 9:
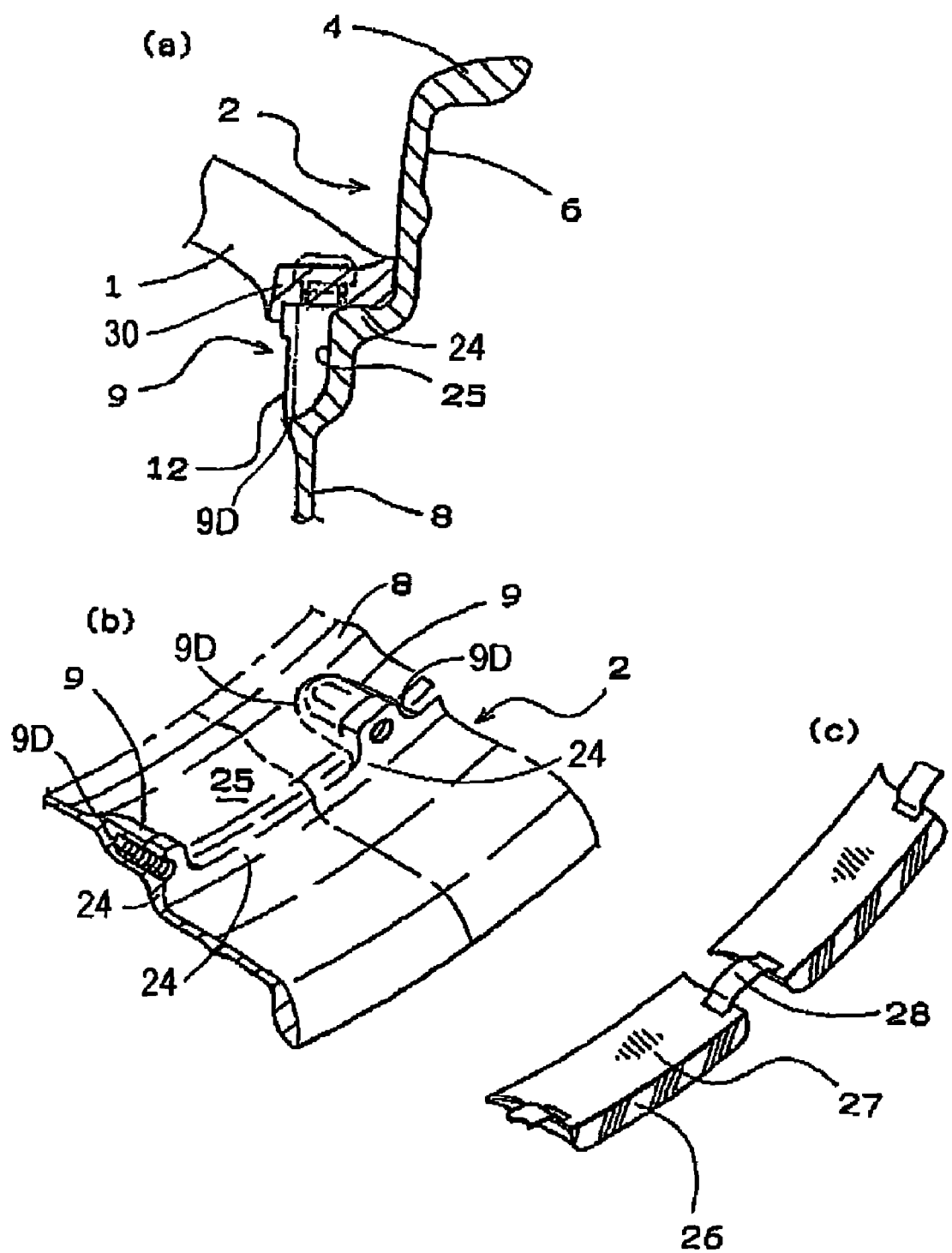
FIGS. 9(a)–9(c) shows an embodiment of a two-piece type built-up wheel, where

As mentioned above, the rim 2 in the FIG. 3 is shaped as an area of hatching. When the center disk 1 is mounted on the rim 2, depressed areas 25 are formed on the rim 2 where the thick-wall portions 9 are absent, as shown in FIG. 9(a). Such mounted state is illustrated in a perspective view of FIG. 9(b) when the wheel is mounted on an automobile. The depressed areas 25 are formed at between the thick-wall portions 9 that are formed in a certain interval, as to be easily deposited with dirt or water. To solve such problem, a dirt-proof layer may be formed by applying ultra water-repellent paint or varnish of silicone-resin base or fluorocarbon-resin base. In otherwise, as shown in FIG. 9(c), onto the depressed areas 25, there may be attached resinous pieces 26 that are shaped as corresponded to the depressed areas 25. The resinous piece 26 may be individually attached on each depressed area 25. In otherwise, the resinous pieces 26 may be coupled together on beforehand by coupling pieces 28, to form a ring-shape linked body or to form a linked body formed of certain number of pieces. Subsequently, such a linked body is attached onto the depressed areas 25. The coupling pieces 28 may be formed as thin portion of the resinous pieces 26, on non-depressed areas, or may be formed of band-shaped metal plates or resin plates, which are of same or different material with the resinous pieces 26 and are embedded within the resinous pieces 26. The resinous pieces 26 are preferably formed of foamed resins for achieving lightweight formation of the wheel, and preferably formed of an aromatic polyamide resin or a polyimide resin. After attaching of such resinous pieces 26 of foamed resins, their exposed faces are coated with the ultra water-repellent paint or varnish as to form dirt-proof layer 27.

Figure 10:
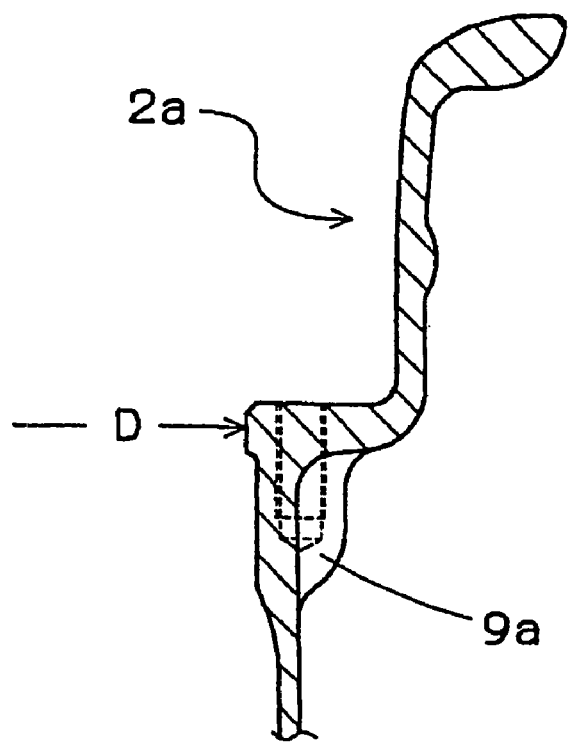
FIG. 10 is a fragmentary front view of the rim in another embodiment.

FIG. 10 is a sectional view showing a state where the thick-wall portions 9a are provided on a tire-mounting side of the rim 2a. Such rim may be readily formed by casting although spinning working after forging is not applicable. The thick-wall portions are formed as to protrude from the rim only at areas the fastener bolts are to be attached. Such rim 2a is advantageous in following. The thick-wall portions enhance strength at bent or curved areas of the rim 2. Further, the thick-wall portions are absent at inner side of the bent or curved areas as to form a surface fitting a cylinder's periphery; and thereby avoiding retention of water or dirt.

Figure 11:
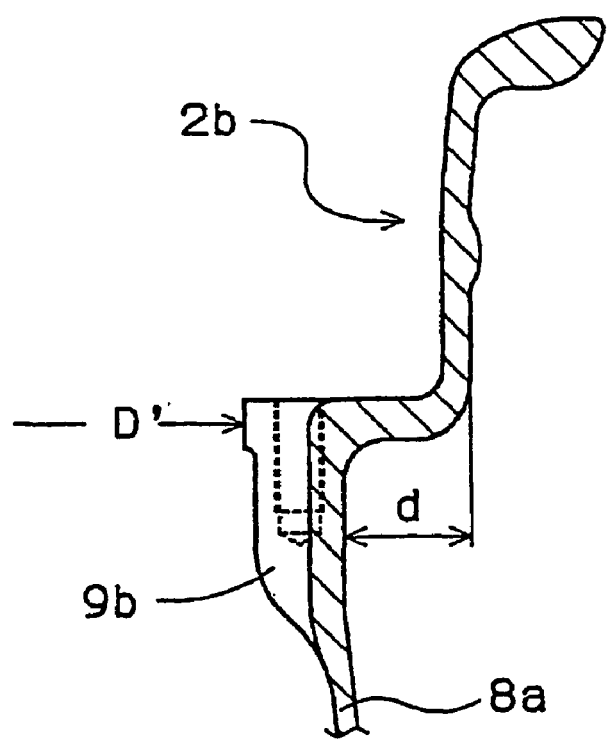
FIG. 11 is a fragmentary front view of the rim in a still other embodiment.
Figure 12:
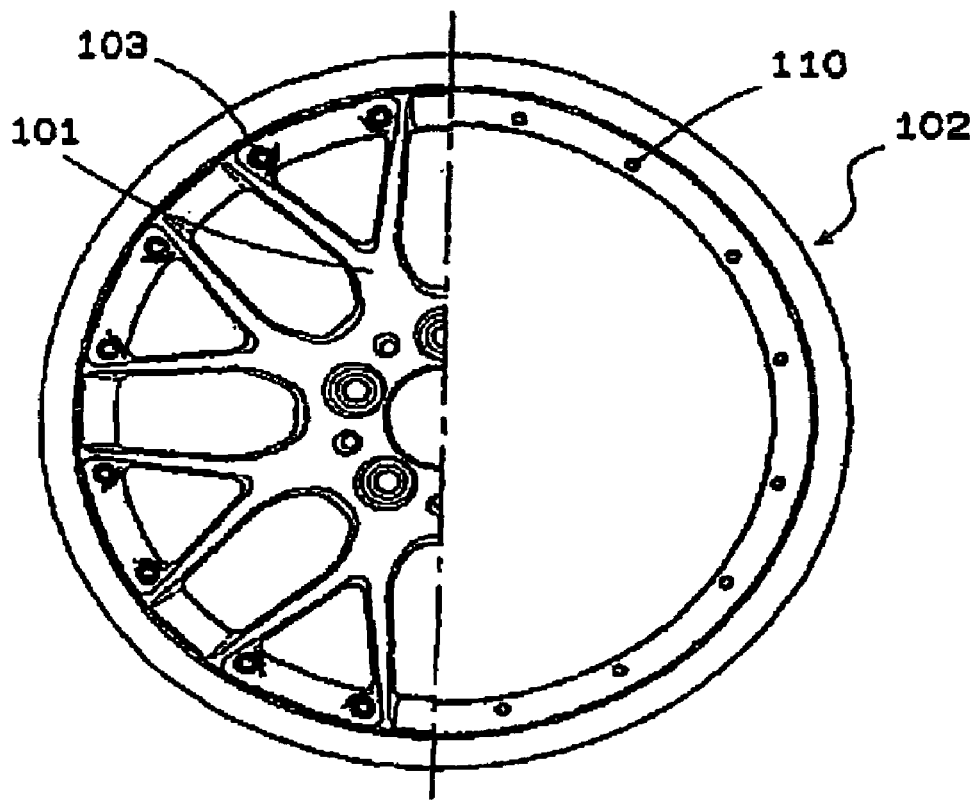
FIG. 12 is a front view of a conventional two-piece type built-up wheel.
Figure 13:
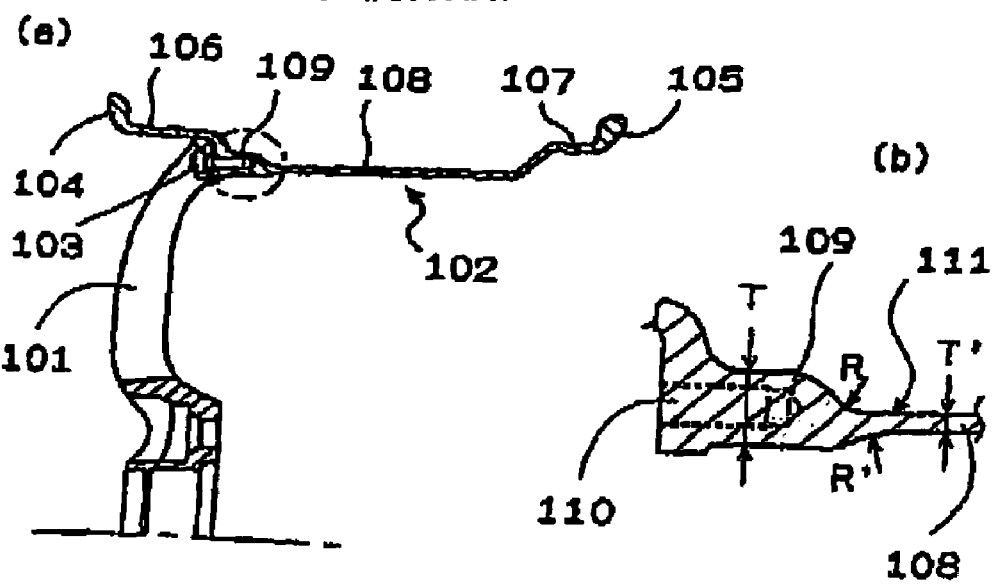

FIG. 11 shows a rim 2b of another shape. When mounting a tire, certain depth d in the rim is needed. If thick-wall portions 9b for fixing the fastener bolts are provided, inner diameter D' at the thick-wall portions become somewhat smaller than that in FIG. 3, and thereby, designed opening for the disk become somewhat smaller. Nevertheless, at other than area having the thick-wall portions, only the rim 2b itself is present; thus, depressed areas are not formed, and thereby, the retention of the water and dirt are avoided. In this point, the rim 2b of the FIG. 11 is advantageous. The rib 2b may be shaped and produced by forging of metal.

INDUSTRIAL APPLICABILITY

As mentioned above, the invention makes a two-piece-wise built-up wheel as to be lightweight as one-piece integral wheel without causing a stress concentration at boundary between the outer rim portion and the well part; because extra thick-wall formation is omitted at inner side of the rim, and thickness of the rim is made as substantially even throughout from the outer rim portion to the well part. Further, heads of the bolts for fastening the rim with the center disk may become points for appealing in ornamental appearance; thus, improving ornamental design of the wheel.

What is claimed is:

1. A light-alloy wheel for automobiles or two-wheeled vehicles comprising:
   a hollow-cylindrical rim, said rim having a thickness and being disposed about a center axis, said rim having outer and inner rim portions integrally formed with each other;
   said outer rim portion having a bead seat, said inner rim portion having a well part and an annular stepped portion, said outer rim portion being connected with said well part of said inner rim portion through said annular stepped portion;
   a center disk built-up with the integral rim, said center disk having an annular fringe, said annular fringe adapted for seating on said annular stepped portion of said inner rim and covering said annular stepped portion of said inner rim;
   a plurality of fastener bolts, said fastener bolts each having a portion being nearby said well part, said fastener bolts each having a length, said fastener bolts fastening said inner rim to said center disk, said length of said fastener bolts extending substantially parallel with nearby portion of said well part; and a plurality of thick-wall portions, said thick-wall portions each having a thickness, a length, and a fringe, said thick-wall portions bulging from and integrally formed with said stepped portion of said inner rim, said thick wall portions bulging toward said rim center, said thick-wall portions each forming a screw hole for each of said fastener bolts, said thick wall portions being disposed along said annular stepped portion of said inner rim and extending along said length of said fastener bolts;

said rim thickness being substantially constant, said substantially constant thickness extending from said bead seat on said outer rim portion through said well part of said inner rim portion, said thickness of said thick-walled portions differing from said thickness of said rim; and a surface of each of said thick-wall portions being smoothly continuous with a surface of said the well part along said fringe of said thick-wall portions.

2. The wheel of claim 1, wherein:

each of said screw holes being a blind hole and extending parallel with said center axis of the said rim;

axial dimension of said thick-wall portions being larger than axial dimension of said screw, and said nearby rim portion extending substantially parallel with said rim center axis.

3. The wheel of claim 1 or 2, wherein said rim further comprises:

a resinous piece being fixed on a depressed area, said depressed area being defined by consecutive ones of said thick-wall portions and said annular fringe part of said the center disk.

4. The wheel of claim 3, further comprising a plurality of resinous pieces, said resinous pieces being adjacently coupled.

5. The wheel of claim 3, wherein at least one of said thick-wall portions and said resinous pieces, together, forms a single smooth circumferential face.

6. The wheel of claim 1, wherein:

each of said screw holes are substantially coaxial with a respective thick-wall portion;

said inner rim having a wheel-center-facing portion and a tire-mounting-side portion; and said thickness of said thick-wall portions being substantially constant between said wheel-center-facing portion and said tire-mounting-side portion, and said wall thickness at such portions being substantially equal to said substantially constant thickness of said rim.

* * * * *